April 21, 1964 C. C. FARONI ETAL 3,129,742
SELF LOCKING NUT HAVING SLOTS TO ACCOMMODATE A COTTER PIN
Filed April 11, 1961
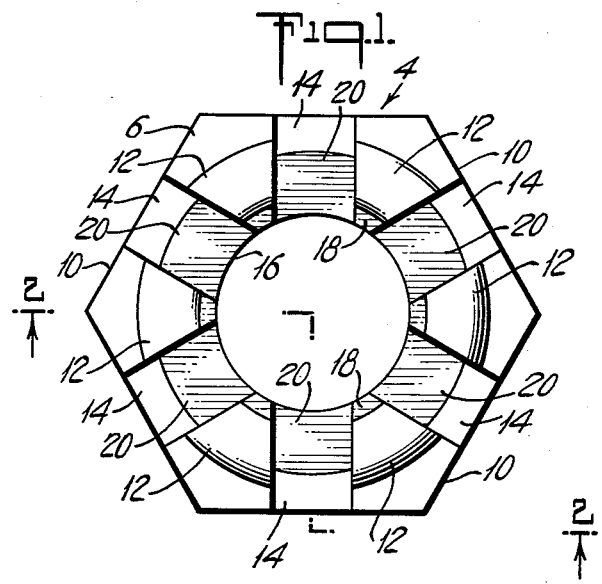
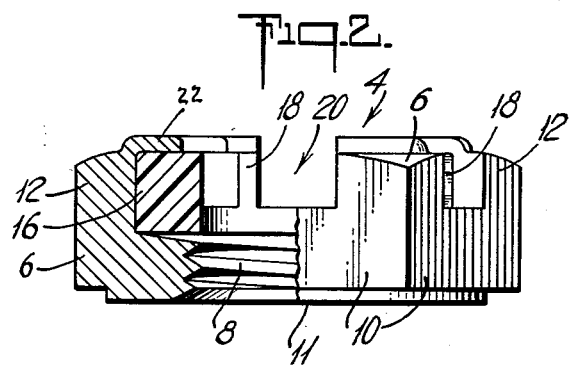
CHARLES C. FARONI
ELLSWORTH M. GUNTHER
ROBERT A. DEGEN
INVENTORS
BY *Richard A. Craig*
ATTORNEY

3,129,742
SELF LOCKING NUT HAVING SLOTS TO ACCOMMODATE A COTTER PIN

Charles C. Faroni, Summit, Ellsworth M. Gunther, Irvington, and Robert A. Degen, Plainfield, N.J., assignors to Elastic Stop Nut Corporation of America, Union, N.J., a corporation of New Jersey
Filed Apr. 11, 1961, Ser. No. 102,286
1 Claim. (Cl. 151—5)

This invention relates to fastening devices and more particularly to nuts and still more particularly to a castellated nut of the prevailing torque type.

It is known and common to lock a castellated nut to a bolt by means of a cotter pin, to obtain some degree of vibration resistance. This type of lock, as heretofore done, is subject to two inherent defects.

The first defect is that often the installer forgets to install the cotter pin, with the result that the castellated nut is free to loosen under vibration.

The second defect is that cotter pins often fail in fatigue due to contact of the cotter pins and the metal castellated nuts. After a cotter pin has failed, the nut is free to loosen under vibration and the pieces of the broken cotter pin may damage surrounding equipment.

A nut according to the present invention obviates the first said defect and minimizes the second said defect and broadly comprises a slotted metallic nut body and a nonmetallic self-locking insert contained within the nut body.

Important objects of the invention are to provide a self-locking castellated nut of the prevailing torque type having the above advantages.

The above and other objects and advantages will appear from the following description of a preferred form of nut according to the invention and the accompanying drawings thereof wherein:

FIG. 1 is a plan view of a nut according to the invention; and

FIG. 2 is a view on line 2—2 of FIG. 1.

The drawings show a self-locking castellated nut 4 of the prevailing torque type. Nut 4 comprises a metallic nut body 6 having an internally threaded portion 8 (FIG. 2) defining a nut axis. Nut 4 is hexagonal and body 6 has six external wrenching surfaces 10 parallel to the nut axis.

Body 6 also has a work clamping face 11 and a plurality of posts 12 extending axially away from that axial end of threaded portion 8 which is remote from work clamping face 11. In the illustrated nut there are six posts 12, one of which coincides with each corner provided by wrenching surfaces 10. Posts 12 are circumferentially spaced from each other to provide a slot 14 between each circumferentially adjacent pair of posts 12. Slots 14 are adapted to accommodate a cotter pin (not shown).

Nut 4 also includes a self-locking collar 16 of nonmetallic resilient material, such as is taught by Sauer U.S. Patent No. 2,450,694 issued October 5, 1948. Collar 16 surrounds the nut axis and is located in body 6 at the axial end of threaded portion 8 remote from clamping face 11. Collar 16 has six posts 18, one of which is axially and radially aligned with each post 12. Posts 18 are circumferentially spaced from each other to provide a slot 20 between each circumferentially adjacent pair of posts 18.

Thus slots 14 and slots 20 are radially aligned with each other.

Each post 12 has a free end 22 which engages collar 16 to hold the latter stationary with respect to body 6.

As shown by way of example, the bottoms of slots 14 and 20 are coplanar, and for best results the bottoms of slots 20 should be at least as far from the axial end of threaded portion 8 remote from clamping face 11 as are the bottoms of slots 14.

As a bolt (not shown) is screwed into nut 4 and engages collar 16, material of collar 16 will tend to be pushed outwardly into slots 14, thus to provide a cushion for a subsequently installed cotter pin, to increase the fatigue life thereof. This is the reason why, for best results, the bottoms of slots 20 should be at least as far from clamping face 11 as the bottoms of slots 14.

The disclosed details are illustrative only and are not to be taken as limitations on the invention except as those details may be included in the appended claim.

What is claimed is:

A self-locking castellated nut of the prevailing torque type comprising a metallic nut body having an internally threaded portion defining an axis and an even number of posts extending axially from a first axial end of said threaded portion, said posts circumferentially spaced and having substantially parallel sides to define diametrically opposite slots therebetween, said slots adapted to accommodate a cotter pin, and a self-locking collar of nonmetallic resilient material in said nut body and having a circumferentially continuous portion surrounding said axis at said first axial end of said threaded portion which is adapted to be engaged by the threads of a corresponding bolt, said collar having a like number of posts extending axially from said circumferentially continuous portion and axially and radially aligned with said posts of said nut body, said posts of said nut body engaging said collar to maintain their relative positioning, said posts of said collar circumferentially spaced from each other to provide a slot between each circumferentially adjacent pair of said posts of said collar, said slots of said collar radially aligned with said slots of said body and the bottoms of said slots of said collar and the bottoms of said slots of said nut body being located substantially the same axial distance from said first axial end of said threaded portion.

References Cited in the file of this patent

FOREIGN PATENTS 541,697    Great Britain _____ Dec. 8, 1941